United States Patent
Okazaki et al.

(10) Patent No.: US 9,440,301 B2
(45) Date of Patent: Sep. 13, 2016

(54) SINKER ELECTRIC DISCHARGE MACHINING APPARATUS

(71) Applicant: SODICK CO., LTD., Kanagawa (JP)

(72) Inventors: Shuji Okazaki, Kanagawa (JP); Akio Hosaka, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 338 days.

(21) Appl. No.: 14/302,433

(22) Filed: Jun. 12, 2014

(65) Prior Publication Data
US 2014/0367364 A1  Dec. 18, 2014

(30) Foreign Application Priority Data
Jun. 12, 2013 (JP) ................................. 2013-123919

(51) Int. Cl.
| | |
|---|---|
| *B23H 1/00* | (2006.01) |
| *B23H 7/30* | (2006.01) |
| *H02K 5/16* | (2006.01) |
| *H02K 5/18* | (2006.01) |
| *H02K 35/02* | (2006.01) |
| *H02K 35/04* | (2006.01) |
| *B23H 7/26* | (2006.01) |

(52) U.S. Cl.
CPC ................ *B23H 7/265* (2013.01); *B23H 7/30* (2013.01); *B23H 1/00* (2013.01)

(58) Field of Classification Search
CPC .......... B23H 1/00; B23H 7/265; B23H 7/30; H02K 5/16; H02K 5/18; H02K 35/02; H02K 35/04
USPC .............. 219/69.15, 69.1, 69.11, 68; 310/91, 310/12.01, 12.31
See application file for complete search history.

(56) References Cited

U.S. PATENT DOCUMENTS

| | | | | |
|---|---|---|---|---|
| 4,152,570 A | * | 5/1979 | Inoue ....................... | B23H 7/28 204/224 M |
| 4,235,153 A | * | 11/1980 | Rinde ..................... | F01B 25/26 310/14 |
| 4,855,558 A | * | 8/1989 | Ramsbro .................. | B23H 7/26 219/69.15 |
| 5,012,144 A | * | 4/1991 | Huitema ............... | H01F 7/1615 310/14 |
| 5,040,372 A | * | 8/1991 | Higham .................. | F16F 7/116 310/15 |
| 5,185,509 A | * | 2/1993 | Todd ..................... | B23K 3/087 219/85.16 |

(Continued)

FOREIGN PATENT DOCUMENTS

| | | |
|---|---|---|
| CN | 1266764 | 9/2000 |
| CN | 2602862 | 2/2004 |

(Continued)

*Primary Examiner* — Arthur O Hall
*Assistant Examiner* — Joseph A Greenlund
(74) *Attorney, Agent, or Firm* — Jianq Chyun IP Office

(57) ABSTRACT

A sinker electric discharge machining apparatus includes a quill 10, to which a tool electrode is attached, and a linear motor device configured to generate a linear movement of the quill towards a workpiece. The quill includes a plate member 11 made of a metal or an alloy, a first reinforcing member 51 fixed to a front surface 14 of the plate member, a second reinforcing member 52 fixed to the front surface of the plate member, a third reinforcing member 53 fixed to a back surface 15 of the plate member and disposed opposite to the first reinforcing member across the plate member, and a fourth reinforcing member 54 fixed to the back surface of the plate member and disposed opposite to the second reinforcing member across the plate member. The quill has a cross-section that is symmetric in a width direction of the plate member.

7 Claims, 4 Drawing Sheets

(56) References Cited

U.S. PATENT DOCUMENTS

| | | | | |
|---|---|---|---|---|
| 5,358,364 | A * | 10/1994 | Kall | B23H 7/265 33/638 |
| 5,702,667 | A * | 12/1997 | Pond | C21D 1/42 219/635 |
| 6,160,236 | A * | 12/2000 | Nordquist | B23H 7/26 219/69.15 |
| 6,252,192 | B1 * | 6/2001 | Lozon | B23H 7/26 219/69.15 |
| 6,353,199 | B1 * | 3/2002 | Hosaka | B23H 1/00 219/69.11 |
| 6,459,063 | B1 * | 10/2002 | Okazaki | B23H 7/26 219/69.2 |
| 6,538,227 | B1 * | 3/2003 | Sano | B23H 1/00 219/69.2 |
| 6,627,838 | B2 * | 9/2003 | Kato | B23H 9/14 219/69.2 |
| 6,683,270 | B2 * | 1/2004 | Tsai | B23H 7/26 219/69.15 |
| 6,747,238 | B1 * | 6/2004 | Tung | B23H 7/30 219/69.2 |
| 7,084,538 | B2 * | 8/2006 | Takashima | B23Q 1/621 310/12.31 |
| 7,329,825 | B2 * | 2/2008 | Awakura | B23H 7/265 219/69.15 |
| 7,538,456 | B2 * | 5/2009 | Miyamoto | H02K 41/03 310/12.24 |
| 7,576,454 | B2 * | 8/2009 | Cheung | B82Y 25/00 310/12.12 |
| 8,237,077 | B2 * | 8/2012 | Liu | B23H 7/265 219/69.15 |
| 8,569,916 | B2 * | 10/2013 | Sugita | H02K 33/16 310/12.15 |
| 8,866,035 | B2 * | 10/2014 | Hsu | B23H 7/26 219/69.11 |
| 8,911,599 | B2 * | 12/2014 | Li | B23H 3/10 204/224 M |
| 2006/0087180 | A1 * | 4/2006 | Woo | F04B 35/045 310/12.25 |
| 2007/0278865 | A1 * | 12/2007 | Matscheko | H02K 41/031 310/12.15 |
| 2009/0016810 | A1 * | 1/2009 | Geiger | B23H 7/26 403/119 |
| 2010/0133925 | A1 * | 6/2010 | Finkbeiner | F16C 29/004 310/12.31 |
| 2014/0367364 | A1 * | 12/2014 | Okazaki | B23H 7/265 219/69.15 |

FOREIGN PATENT DOCUMENTS

| | | |
|---|---|---|
| CN | 2910463 | 6/2007 |
| JP | 2000218443 | 8/2000 |
| JP | 4152507 | 9/2008 |
| JP | 2011073108 | 4/2011 |

\* cited by examiner

SINKER ELECTRIC DISCHARGE MACHINING APPARATUS

CROSS-REFERENCE TO RELATED APPLICATIONS

This application claims the priority benefit of Japan application serial no. 2013-123919, filed on Jun. 12, 2013. The entirety of the above-mentioned patent application is hereby incorporated by reference herein and made a part of this specification.

BACKGROUND OF THE INVENTION

1. Field of the Invention

The present invention relates to a sinker electric discharge machining apparatus adapted for generating an electric discharge in a work gap formed between an electrically conductive workpiece and a tool electrode to machine the workpiece. In particular, the present invention relates to a sinker electric discharge machining apparatus that advances the tool electrode attached to a quill towards the workpiece.

2. Description of Related Art

A sinker electric discharge machining apparatus is widely used for manufacturing a mold precisely. Generally, a tool electrode is attached to a quill or a ram that is vertically movable with use of a tool holder. The tool electrode is usually made of copper or graphite. A workpiece is fixed to a surface plate that is disposed in a work tank. During machining, the work tank is filled with a dielectric liquid, and the tool electrode is positioned very close to workpiece. The size of the work gap may range from several micrometers (μm) to hundreds of micrometers (μm).

When a power pulse is applied to the work gap during ON time, insulation characteristics of the dielectric liquid in the work gap is destroyed and electric discharge is generated. A trace amount of material of the workpiece is evaporated or melted due to the heat of the electric discharge. When the ON time ends, the insulation characteristics of the dielectric liquid in the work gap are recovered, and the voltage application is stopped during the OFF time. The electric discharge forms fine crater-shaped holes in a surface of the workpiece. Usually, the sinker electric discharge machining apparatus controls the ON time and the OFF time in a range of 1μ second to several milliseconds and repeatedly supplies a current pulse to the work gap. For most sinker electric discharge machining apparatuses, the tool electrode is lowered along the Z axis towards the workpiece to maintain the work gap a certain size. The trace of material is gradually removed from the workpiece with no contact between the tool electrode and the workpiece. As a result, a cavity that is complementary to the tool electrode in shape is precisely formed in the workpiece.

The process of washing machined debris, removed from the workpiece, away from the work gap is important to the electric discharge machining. A method of creating a flow of the dielectric liquid through the work gap during the machining is known for achieving this purpose. This method is called "flushing." Flushing prevents undesirable secondary electric discharge that may occur between the machined debris and the tool electrode. Further, the flushing also contributes to the recovery of insulation in the OFF time. A skilled operator may form holes for flushing at appropriate positions on the tool electrode or the workpiece in advance before the machining. Through such holes, clean dielectric liquid can be fed into the work gap and dirty dielectric liquid can be sucked out of the work gap. If the formation of such holes is restricted by the size or shape of the tool electrode, the operator may dispose an injection device at a suitable position for injecting the dielectric liquid to the work gap. The flushing plays a key role in performing electric discharge machining faster and more precisely. However, proficiency is required for creating a uniform and fluent flow in the work gap.

An operation of periodically and rapidly raising and lowering the tool electrode along the Z axis is called "jump." By performing the jump, almost all of the dirty dielectric liquid in the work gap is expelled from the cavity of the workpiece. If a reciprocating distance of the tool electrode is large, more clean liquid flows into the work gap and more dirty liquid is discharged from the work gap. It is preferable to raise the tool electrode for a distance that is at least equal to or greater than the depth of the hole machined in the workpiece. Because the machining is interrupted during the jump operation, it is preferable to accelerate the jump operation. Due to the use of a linear motor and a quill with reduced weight, a sinker electric discharge machining apparatus capable of performing a high-speed and highly-responsive jump operation has been provided. Such sinker electric discharge machining apparatuses have been disclosed in U.S. Pat. No. 6,353,199 and Japanese Patent No. 4152507.

U.S. Pat. No. 6,353,199 discloses a sinker electric discharge machining apparatus, in which linear motor movers are respectively attached to opposing side surfaces of the quill that is shaped like a quadrangular prism. The quill is made of ceramics. Linear motor stators are attached to a stationary frame. Generally, either of the linear motor movers and the linear motor stators are a row of permanent magnets mounted on a base plate. The base plate is a steel sheet, for example. The other of the linear motor movers and the linear motor stators are yokes with armature coils. The yokes are laminated silicon steel sheets. However, it is not easy to attach the linear motor movers, made of a metal or an alloy, to the nonmetallic quill.

The quill has a hole that extends vertically in the axial center of the quill. A cylinder is disposed in the hole to balance the gravitational load that acts upon the quill which can move in high acceleration. An upper end of the cylinder is fixed to the quill using a flange. A piston is slidably disposed in the cylinder. A stationary piston rod is connected to the piston at one end.

The sinker electric discharge machining apparatus of Japanese Patent No. 4152507 includes a lightweight hollow quill shaped like a quadrangular prism and less affected by the thermal effect. The quill is made of a ceramic sintered body or carbon fiber reinforced plastic. To guide a linear movement of the quill, guide rails are attached to side surfaces of the quill and bearing blocks are attached to the stationary frame. The guide rails and the bearing blocks are generally made of a metal or an alloy.

Compared with the quill, the guide rails thermally expand or contract to a larger extent. Therefore, the quill or the guide rails may bend as the temperature changes. To prevent the bending, it can be considered to form the quill thicker. In addition, it can be considered to attach a dummy member, which has the same shape and the same thermal expansion coefficient as the guide rails, to the inner wall of the quill. However, these prevention measures would lead to an increase of the weight of the quill, which is undesirable.

SUMMARY OF THE INVENTION

The present invention provides a sinker electric discharge machining apparatus including a quill that is lightweight and has high rigidity. The present invention further provides a sinker electric discharge machining apparatus capable of moving the quill at a high speed and guiding the quill with high precision.

The present invention relates to a sinker electric discharge machining apparatus, including a quill (10) to which a tool electrode is attached and a linear motor device configured to generate a linear movement of the quill towards a workpiece. The quill includes a plate member (11) made of a metal or an alloy, a first reinforcing member (51) fixed to a front surface (14) of the plate member, a second reinforcing member (52) fixed to the front surface of the plate member, a third reinforcing member (53) fixed to a back surface (15) of the plate member and disposed opposite to the first reinforcing member across the plate member, and a fourth reinforcing member (54) fixed to the back surface of the plate member and disposed opposite to the second reinforcing member across the plate member. The quill has a cross-section that is symmetric in a width direction of the plate member. The first, second, third, and fourth reinforcing members are respectively made of carbon fiber reinforced plastic or ceramics. The linear motor device includes a first linear motor mover (21) attached to the front surface of the plate member between the first and second reinforcing members, and a second linear motor mover (22) attached to the back surface of the plate member between the third and fourth reinforcing members and opposite to the first linear motor mover across the plate member.

Because only the plate member is made of a metal or an alloy that has a large specific gravity, the quill is lighter. Because the reinforcing members made of carbon fiber reinforced plastic or ceramics are fixed to the plate member, the quill is made lighter but still has high rigidity. Because the difference between the thermal expansion coefficients of the linear motor movers and the plate member is small, deformation of the linear motor movers is prevented. Forces that bend the plate member at the front surface and the back surface of the plate member are offset by the reinforcing members.

It is preferable that the cross-section of the quill is symmetric also in a thickness direction of the plate member. The first, second, third, and fourth reinforcing members may be plate-shaped and may be fixed vertically to the plate member. Preferably, the sinker electric discharge machining apparatus further includes two guide devices (31, 32, 33, 34) disposed on lengthwise end surfaces of the plate member and configured to guide the linear movement of the quill. The two guide devices respectively include guide rails (31, 32) made of a metal or an alloy and arranged symmetrically with respect to a central axis (QC) that extends vertically and passes through a centroid of the plate member.

In addition, it is preferable that the sinker electric discharge machining apparatus further includes two balance devices (40, 48) arranged symmetrically with respect to the central axis that extends vertically and passes through the centroid of the plate member, and configured to balance a gravitational load that acts on the quill. The sinker electric discharge machining apparatus further includes a connecting member (46) attached to an upper end of the quill, wherein each of the two balance devices may include a piston rod attached to the connecting member at an end, a stationary cylinder, and a piston attached to the other end of the piston rod and disposed slidably in the stationary cylinder. Because the two balance devices significantly reduce the gravitational load that acts on the quill, the quill can be moved with high responsiveness at a high speed.

DESCRIPTION OF THE EMBODIMENTS

Figure 1:
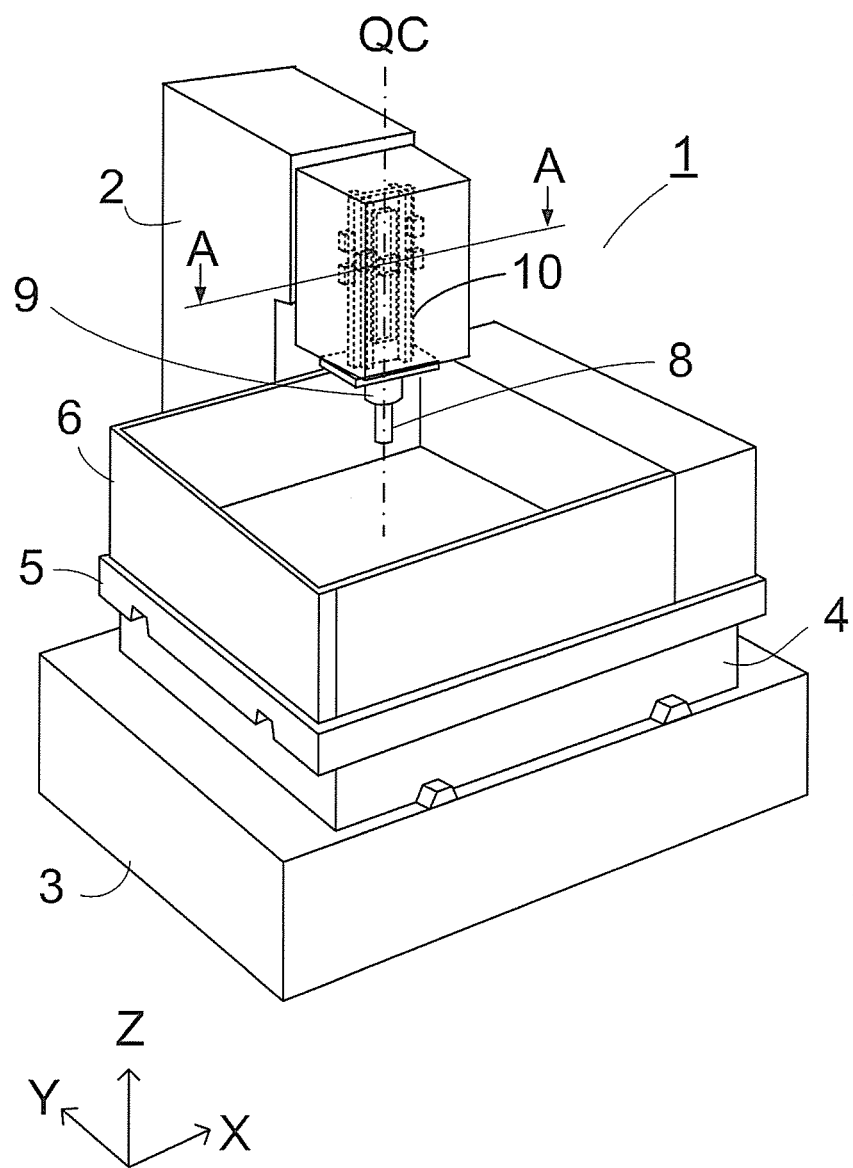
FIG. 1 is a schematic perspective view of a sinker electric discharge machining apparatus of the present invention, an inner portion of which is depicted with dotted lines.

A sinker electric discharge machining apparatus of the present invention is described below with reference to FIG. 1 through FIG. 4. As shown in FIG. 1, a column 2 is disposed behind a bed 3, and a saddle 4 is provided on the bed 3 to slide in a Y-axis direction. A table 5 is provided on the saddle 4 and is disposed to be slidable in an X-axis direction. A work tank 6 is disposed on the table 5 for fixing a workpiece (not shown) therein. The work tank 6 is filled with a dielectric liquid during machining.

A holding member 7 is fixed to a front surface of the column 2. The holding member 7 has a hole through which a quill 10 passes vertically. The quill 10 is held movably in a Z-axis direction by the holding member 7. A tool electrode 8 may be directly or indirectly attached to a lower end of the quill 10. In the embodiment, the tool electrode 8 is attached to the lower end of the quill 10 by a tool holder 9 and a partition plate 66. The sinker electric discharge machining apparatus 1 is configured to precisely move the tool electrode 8 by acceleration and deceleration that exceeds the gravitational acceleration (1G), and at a speed of 10 m/min or more. Thus, a jump operation of a large movement amount can be performed without reducing a material removal rate.

Figure 2:
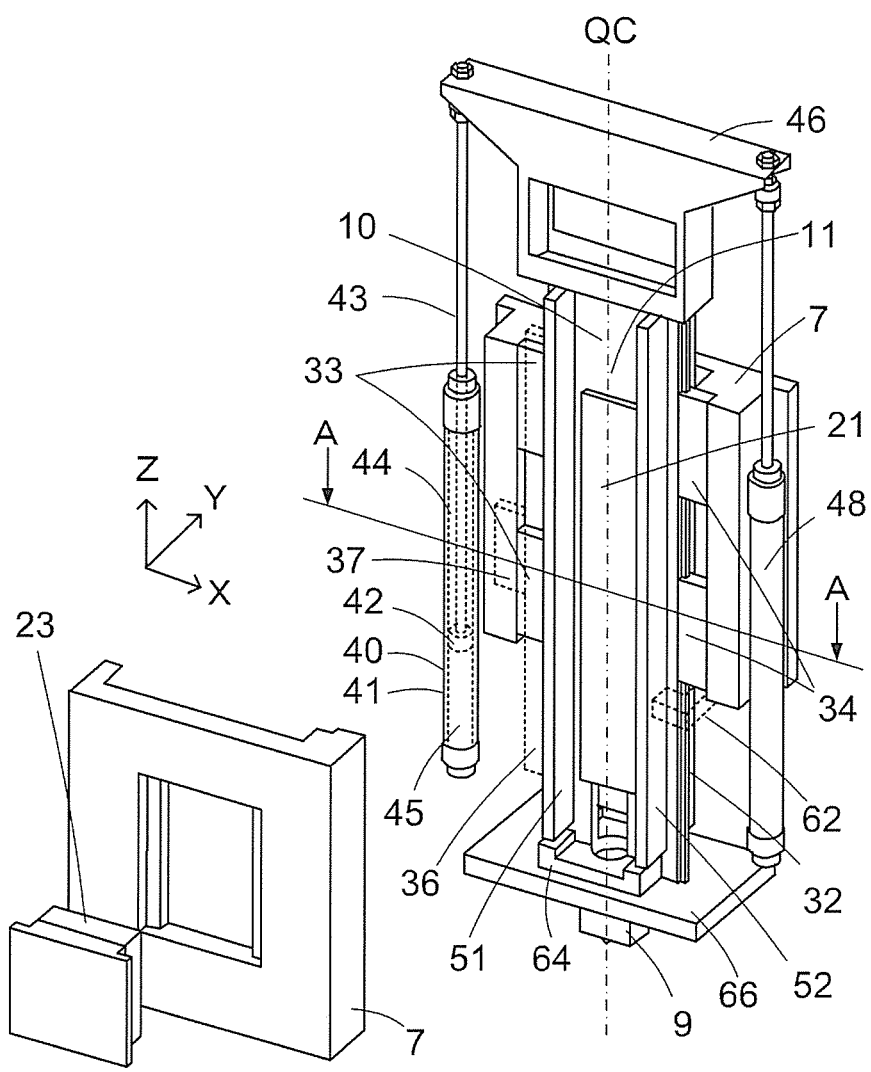
FIG. 2 is a schematic perspective view showing an exploded view of a quill and part of a holding member of FIG. 1.

As shown in FIG. 2, the quill 10 includes a plate member 11 and plate-shaped reinforcing members 51, 52, 53, and 54. The plate member 11 extends in the Z-axis direction. Because the plate member 11 is made of a metal or an alloy, the plate member 11 can be machined with high dimensional precision easily. In addition, the reinforcing members 51, 52, 53, 54, etc. can be secured to the plate member 11 easily. The reinforcing members 51, 52, 53, and 54 are identical to each other in terms of shape and material, and each has a rectangular cross-section.

Figure 3:
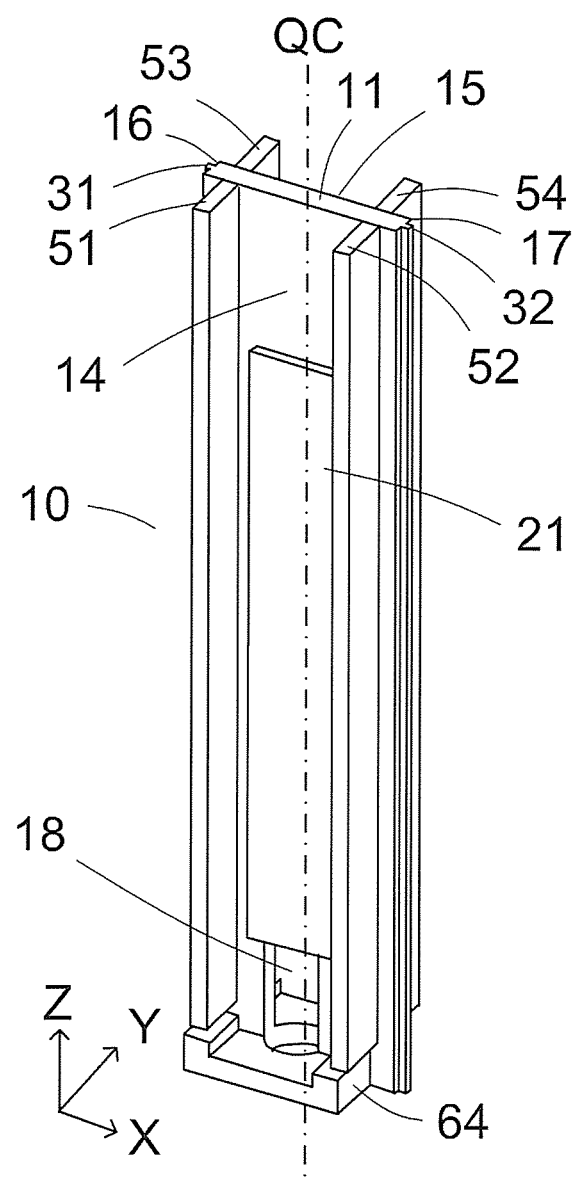
FIG. 3 is a schematic perspective view showing the quill of FIG. 2.

As shown in FIG. 3, the pair of reinforcing members 51 and 52 is vertically fixed to the plate member 11 on a front surface 14 of the plate member 11. The other pair of reinforcing members 53 and 54 is vertically fixed to the plate member 11 on a back surface 15 of the plate member 11. The reinforcing members 51, 52, 53, and 54 are made of carbon fiber reinforced plastic and extend parallel to the Z-axis direction and each other. An adhesive agent is used to fix the reinforcing member 51, 52, 53, and 54. The reinforcing member 51 is opposite to the reinforcing member 53 across the plate member 11, and the reinforcing member 52 is opposite to the reinforcing member 54 across the plate member 11. The plate member 11 and the reinforcing members 51, 52, 53, and 54 are equal in length. The cross-section of the quill 10 is symmetric in a width direction and a thickness direction of the plate member 11.

Because the reinforcing members 51, 52, 53, and 54 are made of a material having high rigidity and a small specific gravity, the size of the metallic or alloy portion of the quill 10 is minimized. Therefore, the weight of the quill 10 is reduced and the rigidity of the quill 10 is increased. The reinforcing members 51, 52, 53, and 54 may also be made of ceramics that has a small specific gravity. Bending that occurs on the side of the front surface 14 of the plate member 11 due to the large difference between the thermal expansion coefficients of the plate member 11 and the reinforcing members 51 and 52 is offset by the bending that occurs on the side of the back surface 15 of the plate member 11. Accordingly, bending of the quill 10 is prevented.

The tool electrode 8 and the tool holder 9 are disposed coaxially with a central axis QC. The central axis QC is a line that extends vertically and passes through a centroid of the plate member 11. As shown in FIG. 2, the partition plate 66 may be disposed between the lower end of the quill 10 and the tool holder 9. A fixing plate 64 is disposed for fixing the partition plate 66 to the lower end of the quill 10. The plate member 11 may have an opening 18 close to the tool holder 9. When a rotating device for rotating the tool electrode 8 is mounted on the tool holder 9, the opening 18 provides sufficient room for the tool holder 9.

The quill 10 can be moved at an acceleration of 1G or more in the Z-axis direction by two linear motors. A first linear motor mover 21 is attached to the front surface 14 of the plate member 11 between the reinforcing members 51 and 52. A second linear motor mover 22 is attached to the back surface 15 of the plate member 11 between the reinforcing members 53 and 54. The first and second linear motor movers 21 and 22 are arranged symmetrically with respect to the central axis QC and are opposite to each other across the plate member 11. Each of the linear motor movers 21 and 22 includes a base plate and a row of permanent magnets attached to the base plate. The base plate may be a steel sheet. If the plate member 11 is made of an iron-based material, the permanent magnets may be attached to the surface of the plate member 11 directly.

A first linear motor stator 23 is fixed to the holding member 7 and disposed opposite to the first linear motor mover 21 with an air gap therebetween. A second linear motor stator 24 is fixed to the holding member 7 and disposed opposite to the second linear motor mover 22 with an air gap therebetween. The air gaps on the side of the front surface 14 and the side of the back surface 15 of the plate member 11 are equal in size. Each of the first and second linear motor stators 23 and 24 includes an armature coil and a yoke. A combined force of the thrusts of the two linear motors is applied to the central axis QC.

Two guide devices are configured for guiding the linear movement of the quill 10 in the Z-axis direction. The two guide devices are disposed on lengthwise end surfaces 16 and 17 of the plate member 11. The guide devices respectively include guide rails 31 and 32. The guide rails 31 and 32 are disposed symmetrically with respect to the central axis QC and attached to the lengthwise end surfaces 16 and 17 of the plate member 11. The guide rails 31 and 32 may be formed integrally with the plate member 11. A pair of guide blocks 33 engaged with the guide rail 31 is fixed to the holding member 7. A pair of guide blocks 34 engaged with the guide rail 32 is fixed to the holding member 7. The guide rails 31 and 32 and the guide blocks 33 and 34 are made of a metal or an alloy. The guide blocks 33 and 34 may be attached to the lengthwise end surfaces 16 and 17 of the plate member 11, and the guide rails 31 and 32 may be fixed to the holding member 7.

Because the plate member 11, the linear motor movers 21 and 22, the guide rails 31 and 32, and the guide blocks 33 and 34 are made of a metal or an alloy, deformation resulting from the large difference in the thermal expansion coefficient is prevented. Since deformation of the linear motor movers 21 and 22, the guide rails 31 and 32, and the guide blocks 33 and 34 is prevented, the quill 10 can be moved with high precision.

A device for detecting a position of the quill 10 in the Z-axis direction includes a scale 36 and a sensor 37. The scale 36 is attached to the front surface 15 of the plate member 11 by a bracket 38. The sensor 37 is attached to the holding member 7 and configured to read the scale 36. A brake device 62 for holding a portion of the quill 10 to prevent falling of the quill 10 may be disposed on the holding member 7 or the column 2.

Figure 4:
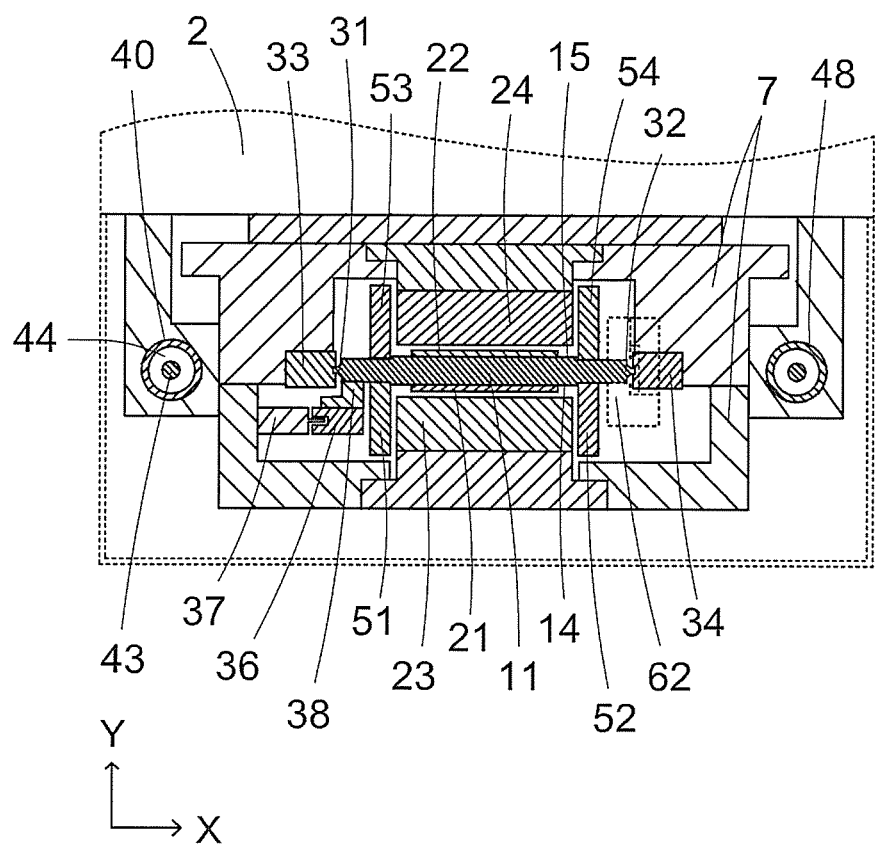
FIG. 4 is a schematic cross-sectional view of a bed portion taken along the A-A line of FIG. 2.

The sinker electric discharge machining apparatus 1 includes two balance devices 40 and 48, as shown in FIG. 2 and FIG. 4. The balance devices 40 and 48 are configured to balance the gravitational load that acts on the quill 10. The gravitational load that acts on the quill 10 changes with the mass of a Z moving body. The Z moving body is the quill 10 mainly, but includes the linear motor movers 21 and 22, the partition plate 66, the tool holder 9, the tool electrode 8, etc. The gravitational load that acts on the quill 10 changes with the mass of the tool electrode 8 that is used, for example.

The balance devices 40 and 48 are attached to the quill 10 by a connecting member 46. The connecting member 46 is fixed to an upper end of the quill 10. The balance devices 40 and 48 are respectively disposed at the left and right ends of the connecting member 46 and arranged symmetrically with respect to the central axis QC. Each of the balance devices 40 and 48 includes a piston rod, a piston, and a stationary cylinder. An upper end of the piston rod 43 of the balance device 40 is fixed to an end of the connecting member 46, and an upper end of the piston rod of the balance device 48 is fixed to the other end of the connecting member 46. A lower end of the piston rod 43 is attached to the piston 42. The cylinder 41 of the balance device 40 is fixed to the holding member 7 or the column 2. The piston 42 is disposed slidably in the stationary cylinder 41, and the space in the cylinder 41 is divided into an upper chamber 44 and a lower chamber 45 by the piston 42.

The balance device 48 is the same as the balance device 40, and therefore detailed descriptions thereof are not repeated hereinafter. The lower chamber 45 of the cylinder 41 is connected with an air source, such as a compressor or the like, through a precision air regulator. The upper chamber 44 is substantially open. The precision air regulator is configured to maintain a constant air pressure in the lower chamber 45 by supplying air to the lower chamber 45 or discharging air from the lower chamber 45 at a high speed. When the pressure in the lower chamber 45 increases due to the falling of the quill 10, the precision air regulator discharges the air in the lower chamber 45 at a high speed. When the pressure in the lower chamber 45 decreases due to the rising of the quill 10, the precision air regulator supplies air into the lower chamber 45 at a high speed. The air pressure in the lower chamber 45 can be set by the precision air regulator. The air pressure in the lower chamber 45 is set to a value that creates a balancing force to balance the gravitational load acting on the quill 10. With use of the balance devices 40 and 48, the power supplied to the linear motor is saved when the quill 10 is stationary. In order to prevent dust from entering the apparatus, the quill 10, the holding member 7, and the two linear motors may be covered by a suitable cover or bellows.

The embodiment was chosen in order to explain the principles of the present invention and its practical application. Many modifications and variations are possible in light of the above teachings. It is intended that the scope of the present invention be defined by the claims below.

What is claimed is:

1. A sinker electric discharge machining apparatus, comprising:
    a quill to which a tool electrode is attached and a linear motor device configured to generate a linear movement of the quill towards a workpiece,
    wherein the quill comprises a plate member made of a metal or an alloy, a first reinforcing member fixed to a front surface of the plate member, a second reinforcing member fixed to the front surface of the plate member, a third reinforcing member fixed to a back surface of the plate member and disposed opposite to the first reinforcing member across the plate member, and a fourth reinforcing member fixed to the back surface of the plate member and disposed opposite to the second reinforcing member across the plate member, and the quill has a cross-section that is symmetric in a width direction of the plate member,
    wherein the first, second, third, and fourth reinforcing members are made of one of carbon fiber reinforced plastic or ceramics, and
    wherein the linear motor device comprises a first linear motor mover attached to the front surface of the plate member between the first and second reinforcing members, and a second linear motor mover attached to the back surface of the plate member between the third and fourth reinforcing members and disposed opposite to the first linear motor mover across the plate member.

2. The sinker electric discharge machining apparatus according to claim 1, wherein the cross-section of the quill is symmetric in a thickness direction of the plate member.

3. The sinker electric discharge machining apparatus according to claim 1, wherein the first, second, third, and fourth reinforcing members are plate-shaped and are fixed vertically to the plate member.

4. The sinker electric discharge machining apparatus according to claim 1, further comprising two guide devices disposed on lengthwise end surfaces of the plate member and configured to guide the linear movement of the quill.

5. The sinker electric discharge machining apparatus according to claim 4, wherein the two guide devices respectively comprise guide rails made of a metal or an alloy and arranged symmetrically with respect to a central axis that extends vertically and passes through a centroid of the plate member.

6. The sinker electric discharge machining apparatus according to claim 1, further comprising two balance devices arranged symmetrically with respect to a central axis that extends vertically and passes through a centroid of the plate member, and configured to balance a gravitational load that acts on the quill.

7. The sinker electric discharge machining apparatus according to claim 6, further comprising a connecting member attached to an upper end of the quill, wherein each of the two balance devices comprises a piston rod attached to the connecting member at an end, a stationary cylinder, and a piston attached to the other end of the piston rod and disposed slidably in the stationary cylinder.

* * * * *